Nov. 7, 1933.   L. A. RUSSELL   1,933,874
DRIVE GEARING FOR SHOVEL CRANES
Filed Oct. 20, 1930   5 Sheets-Sheet 3
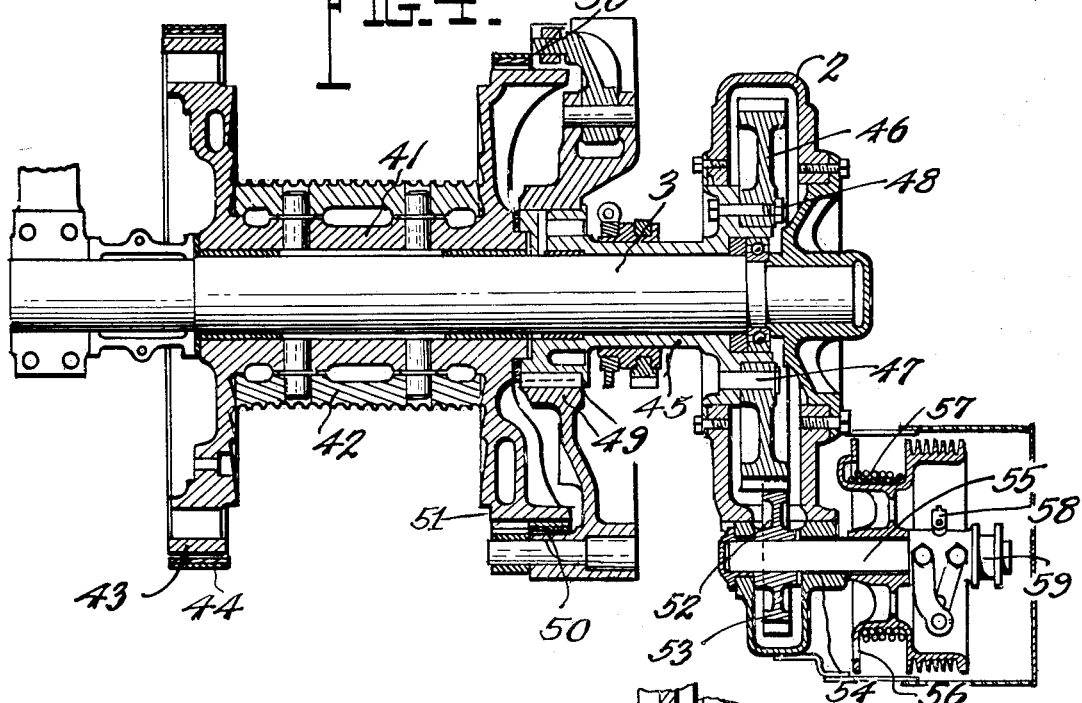
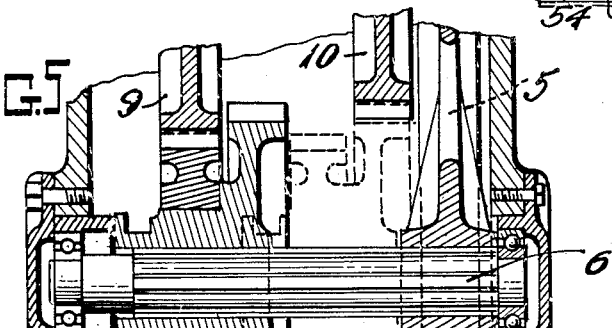
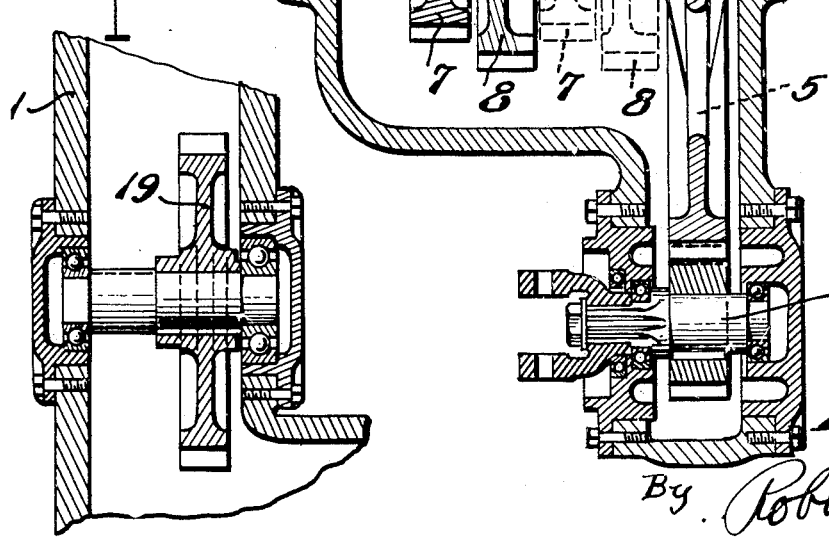
INVENTOR
L. A. Russell
By Robb & Robb
ATTORNEYS

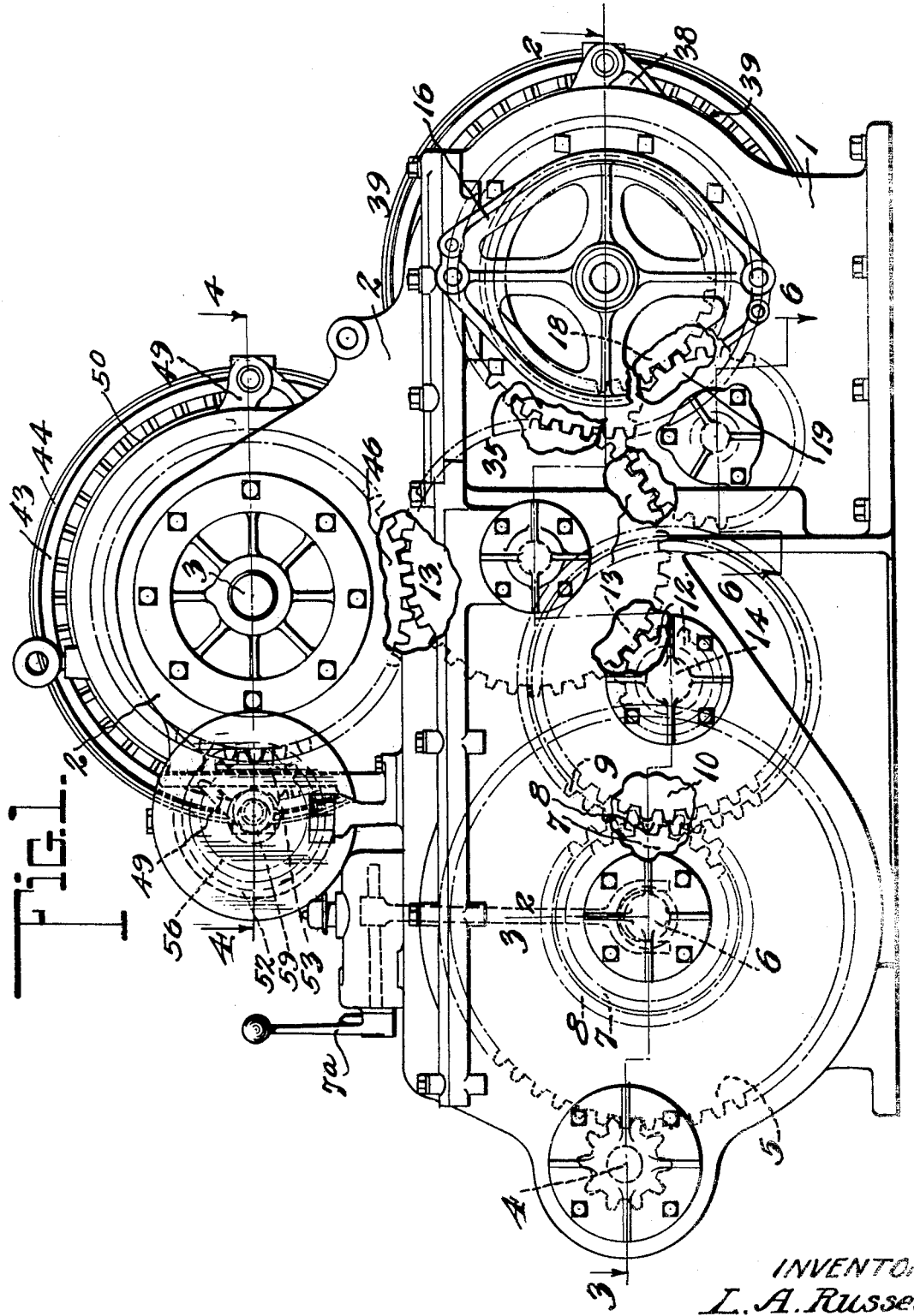

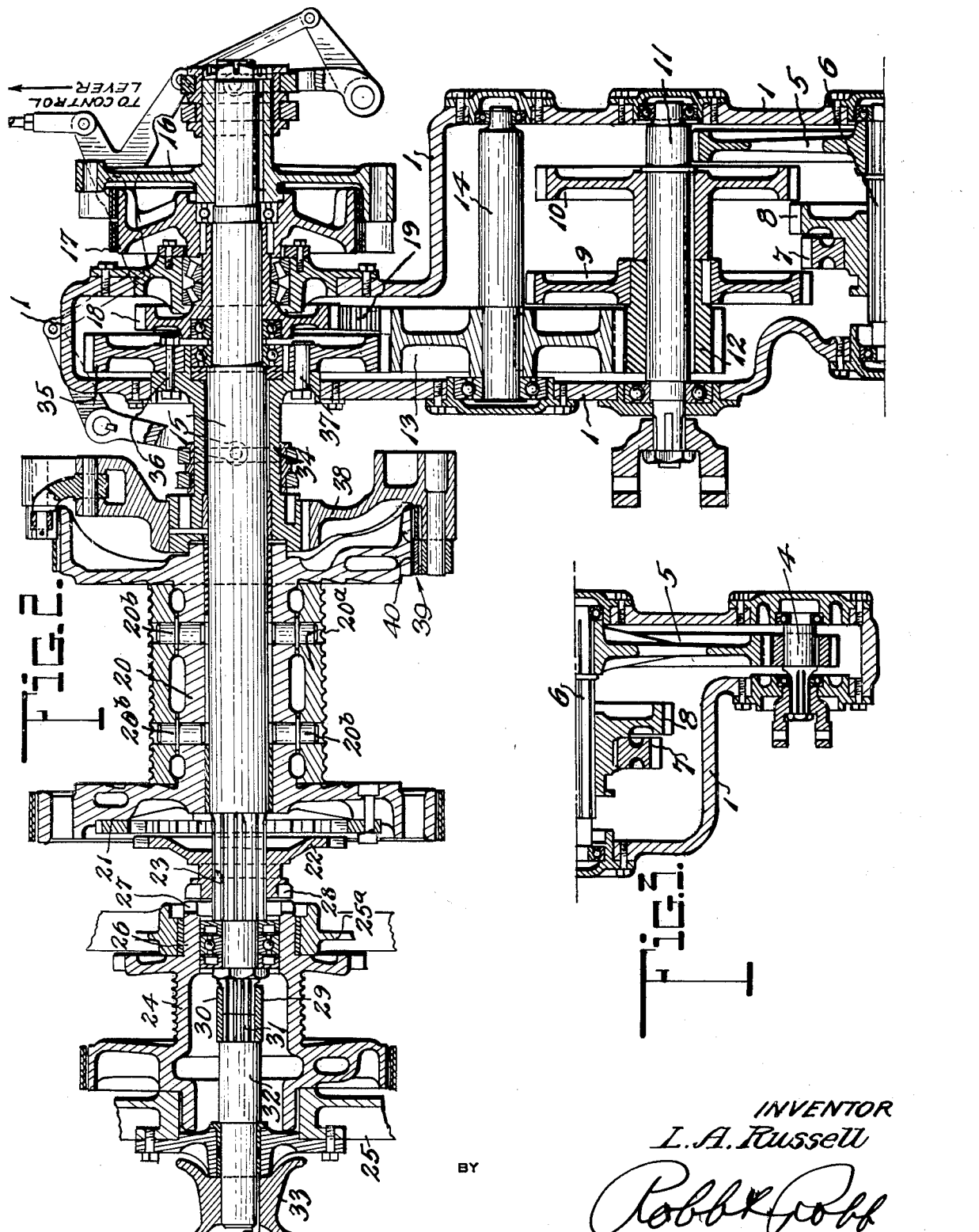

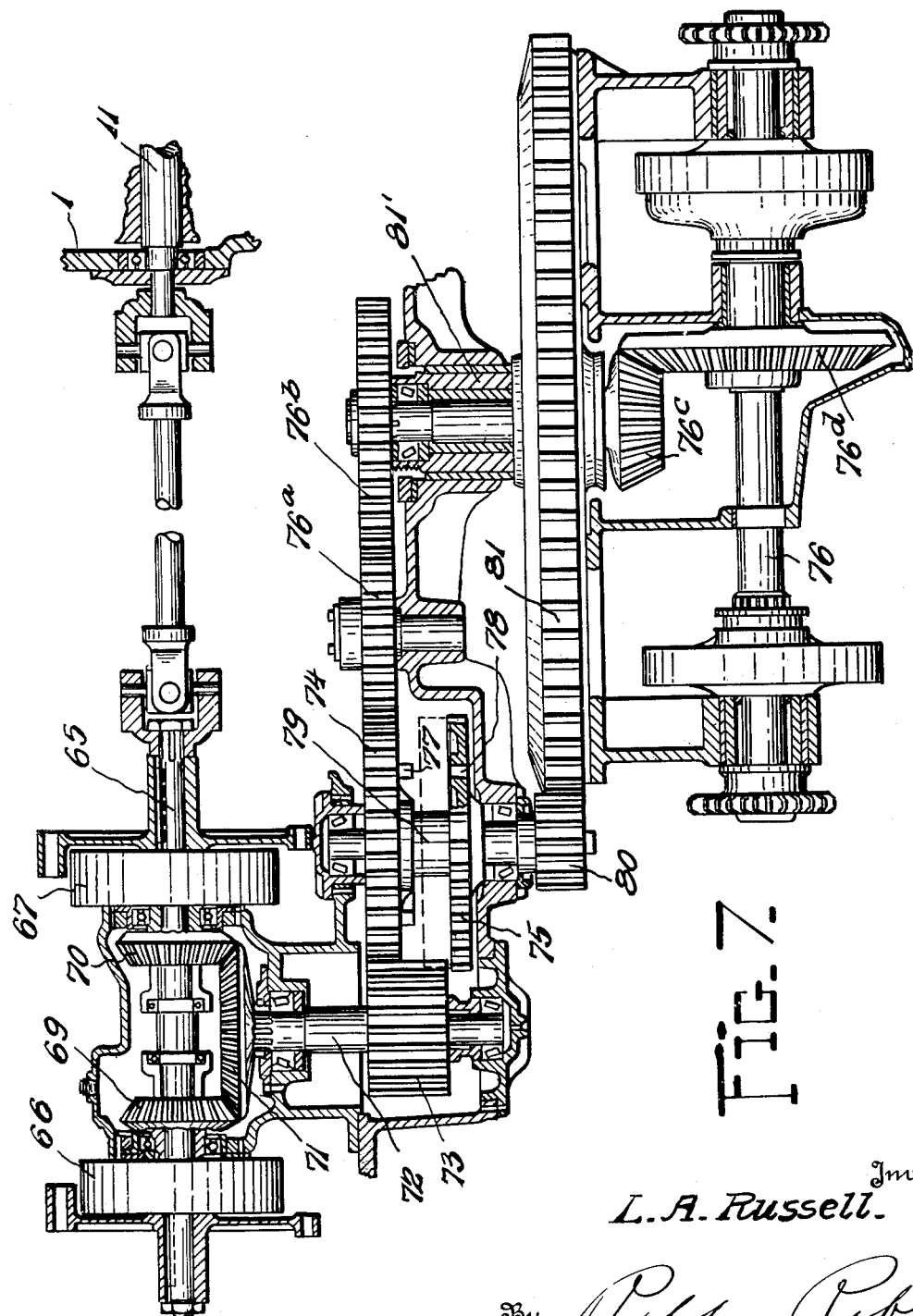

Nov. 7, 1933.  L. A. RUSSELL  1,933,874

DRIVE GEARING FOR SHOVEL CRANES

Filed Oct. 20, 1930   5 Sheets-Sheet 5

Inventor
L. A. Russell.

By Robbar Cobb
Attorneys

Patented Nov. 7, 1933

1,933,874

UNITED STATES PATENT OFFICE 1,933,874

DRIVE GEARING FOR SHOVEL CRANES

Leslie A. Russell, Milwaukee, Wis., assignor to Koehring Company, Milwaukee, Wis., a corporation Application October 20, 1930. Serial No. 490,055

6 Claims. (Cl. 254—185)

In the art of cranes, draglines and power shovels, it is the custom to supply these machines with series of different attachments whereby the same may be converted for various types of work such as shovel work, dragline work or the like.

In practice it is only necessary to replace the boom or particular attachment being used with an attachment of the type adapted for the particular work desired. Examples of these types of machines are disclosed in the patents to Holcomb No. 1,506,906 and Russell No. 1,676,355.

In these machines, as well as the present day design, an exposed type of gearing is used which has a considerable number of disadvantages as well as causing considerable noise and more or less inefficiency of operation, and the exposed gearing is, of course, a dangerous menace to the operator or workman on the machine. Further than this, the usual type of machine uses two separate trains of gearing, one located on each side of the machine to obtain the desired direction of rotation of the drums. This construction requires the use of two complete sets of relatively large gears which are, as before mentioned, exposed and require considerable attention to keep them lubricated and in proper working condition. Also this type of construction makes it more or less impossible to obtain a quietly operating machine since the gears are necessarily noisy and soon run dry if they are not continually serviced.

In my improved type of machine, I propose to use a single train of operating gears, all of which are located on one side of the drum assemblies, these gears being arranged to permit instant and proper control of direction of the drums of the excavating machine.

Another object is to mount these gears in a unitary casing whereby they may be entirely enclosed and capable of operation in a continuous bath of oil.

Another object of my invention is to provide the supporting drum shafts and cooperating gearing on anti-friction bearings within the casing, whereby proper lubrication at all times is available.

In this connection, it is notable that an intermediate pinion is provided between the cooperating gearing located on the front and rear drum shaft assemblies whereby it is possible to use comparatively small gearing which may be conveniently located in the main gear casing, said casing being of comparatively small size. Further than this, my present construction permits the use of two-speed drive to all the parts of the machine, as well as the cable drums, making it unnecessary to change the lagging of the drums, when the machine is changed to do different types of work. When dragline work is being effected, it is, of course, desirable to use a lower cable line speed than when the machine is used as a shovel or a crane, and considerable delay is prevented which would otherwise be the case if the lagging had to be changed to convert the machine to the other type of work.

In my improved type of crane, this change of speed gear ratio is easily accomplished, and if desired it is possible to place the change speed gears in a neutral position whereby the operation of the engine is not effective to operate the crane.

By utilizing a gear casing of the type just described, it is possible to use ball and roller bearing members throughout. By providing an intermediate idler pinion between the gears of the front and rear drum shaft assemblies, it is possible to place all the clutch members for controlling the front drums, namely, the crowding out and racking in drum, for operation of the shipper shaft when the shovel attachment is used, and the boom hoist drum on the same shaft, which was impossible with the previous types of construction referred to.

Other and further objects and advantages of the invention will be hereinafter set forth and the novel features thereof defined by the appended claims.

In the drawings:

Fig. 1 is a side elevation of my improved shovel crane gear casing, parts being broken away to to show certain of the elements of the gear train in elevation;

Fig. 2 is a substantially horizontal sectional view taken through the gear casing approximately on the line 2—2 of Fig. 1;

Fig. 3 is a similar view taken on the line 3—3 of Fig. 1;

Fig. 4 is a horizontal sectional view through the casing taken approximately on the line 4—4 of Fig. 1;

Fig. 5 is an enlarged fragmentary horizontal sectional view taken through the change speed gear train showing the gears in low speed position in full lines and in high speed position in dotted lines;

Fig. 6 is a fragmentary detail sectional view taken approximately on the line 6—6 of Fig. 1 showing the pinion for obtaining reverse drive for the front drum;

Fig. 7 is a somewhat diagrammatic vertical sectional view disclosing the parts for obtaining the drive from the shaft 11 to the combined swing and traction mechanism.

Figure 8:
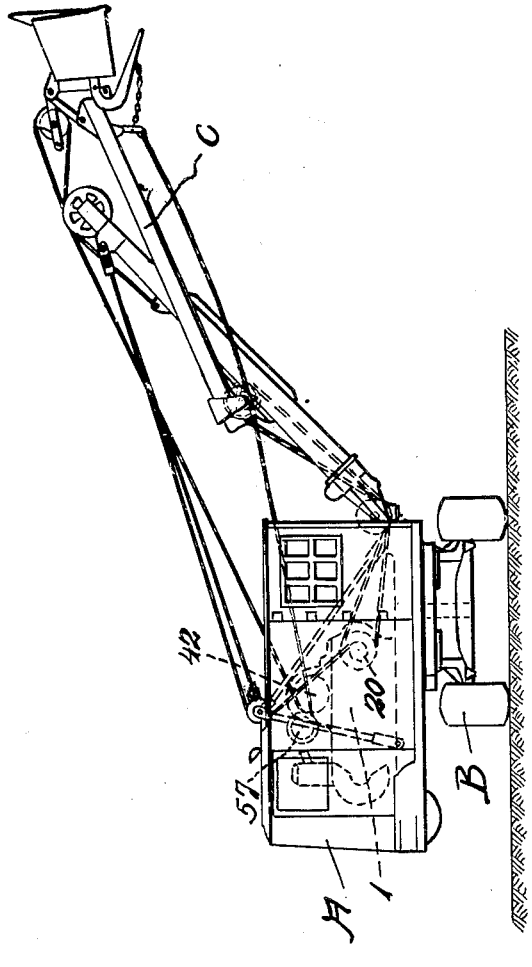
Fig. 8 is a diagrammatic view of a convertible machine constructed in accordance with my invention.

Like reference characters refer to like parts in the several figures of the drawings, in which 1 represents the lower half of the gear casing containing the gears for operating the front and rear drums of the excavating machine. This casing is preferably a unitary casting, as seen in Figs. 1 and 2, and is provided with a cover 2 supporting one end of the rear drum shaft 3. Power from an engine (not shown) operates the drive shaft 4 carrying a pinion which meshes with a large gear 5 carried on the change speed gear shaft 6. Splined to the shaft 6 in sliding relation are the pinions 7 and 8 which are adapted to be moved by manual manipulation of the gear shift lever 7a into meshing relation with the pinions 9 and 10 carried on the swing and traction gear shaft 11.

The swing and traction mechanism, as shown diagrammatically in Fig. 7, comprises a shaft 65 which is adapted to be coupled to rotate with the shaft 11 carried by the unitary housing 1. This shaft 65 is provided with two clutch members 66 and 67 which may be alternately engaged to cause rotation of either one or the other of the bevel pinions 69 and 70. The pinions 69 and 70 mesh with a bevel pinion 71 carried on the vertical shaft 72 which is in turn journaled in the machine frame proper. The shaft 72 carries thereon a spur pinion 73 which meshes with a gear 74 loose on a sleeved pinion 75. The gear 74 is adapted to be shifted vertically by suitable control levers so that when the gear is moved to the upper position, as shown in Fig. 7, it communicates power to the traction shaft 76 through the intermediate gears 76a, 76b, 76c and 76d.

When it is desired to swing the carbody, the slidable gear 74 is dropped to permit the jaw clutch members 77 carried thereby to engage the openings in the sleeved gear or clutch member 78. At this time it will be observed that the gear 74 will move out of mesh with respect to the intermediate pinion 76a but maintains its meshing relation with respect to the pinion 73. The sleeved pinion or clutch member 78 is keyed to the swing shaft 79 which carries fixed thereto the pinion 80 meshing with the ring gear 81 carried on the base of the machine.

From the above it will be observed that rotation of the shaft 72 in either direction will cause the pinion 80 to be rotated, and since this pinion is carried on the shaft 79 which is mounted in the carbody and that the carbody is pivotally mounted at 81' on the traction base, the carbody will be rotated with respect to the traction base incident to rotation of the pinion 80 which meshes with the ring gear 81 fixed to the traction base.

In the diagrammatic view, Fig. 8, A represents the carbody while B represents the traction base. The excavating attachments are indicated generally at C and in this particular illustration the shovel attachment is shown.

When the gears 7 and 9 are moved into meshing relation, as seen in Fig. 5, a low speed driving relation is established between the drive shaft 4, the swing and traction mechanism and the front and rear drums, while, on the other hand, when the gear 8 is moved into meshing relation with the gear 10, as seen in dotted lines in Fig. 5, a high speed driving relation is established between these parts.

Keyed to the swing and traction shaft 11 is the pinion 12 which is constantly in mesh with an idler pinion 13 carried by the idler shaft 14. The use of this idler shaft and pinion is a very important part of my invention in that it permits the use of a comparatively small and condensed set of gears.

The front drum shaft assembly, as seen in the upper part of Fig. 2, comprises a front drum shaft 15 to which is keyed a clutch band carrier 16. Clutching engagement between the bands of the carrier 16 and the clutch drum 17 may be accomplished when desired which establishes a driving relation between the shaft 15 and a sleeved pinion 18 freely carried on the shaft 15. In order to establish driving relation between the pinion 18 and the pinion 13 on the idler shaft, a reversing pinion 19 is provided which is constantly in mesh with the two pinions just referred to. The front cable drum 20 freely rotatable on the front drum shaft 15 is provided with an internal clutch face 21 adapted to receive the clutch element 22 which is splined on the shaft 15 at 23. When this clutch element 22 is moved to clutching engagement with the internal clutch face 21, it will be observed that rotation of the shaft 15 in a clockwise direction will also cause rotation in a clockwise direction of the cable drum 20. This direction of rotation is used for racking in the shovel when the machine is being used with the shovel attachment.

The boom hoist cable drum 24 is rotatably carried on the frame members 25 and 25a of the machine and is provided with a sleeved bearing extension 26 having a jaw clutch face 27. The splined clutch member 22 is provided with a cooperating jaw clutch 28 which is adapted to engage the clutch 27 of the boom hoist drum when the member is moved to the left. This establishes a driving relation between the shaft 15 and the boom hoist drum 24 and when the clutch elements 16 and 18 are engaged, rotation of the shaft 15 for raising the boom is accomplished.

The left hand extremity of the shaft 15 is splined at 29 to receive the splined coupling 30, which coupling in turn receives the splined end 31 of the winch head shaft 32. This shaft is suitably journaled in the frame and carries keyed thereto the winch head 33. The winch provides an auxiliary power device which is also available for use when the clutch elements 16 and 17 are engaged.

The sleeve member 34 is freely rotatable on the shaft 15 and carries at one end thereof the driving pinion 35 meshing directly with the pinion 13 on the idler shaft 14. This driving pinion 35 is securely fastened to the sleeve member 34 by the bolts 36 and driving pins 37. Keyed to the other end of the sleeve member 34 is a clutch spider 38 having a band clutch 39 adapted to engage the friction band clutch surface 40 forming a part of the front drum 20.

From the above it will be observed that the driving relation between the pinion 13 on the idler shaft 14 and the drum 20 may be also established by engagement of the clutch band 39 with the clutch band surface 40 carried by the drum, and since a reverse pinion 19 is interposed between the pinion 18 and the pinion 13, rotation of the drum 20 in a counterclockwise direction or opposite from the direction of rotation of the drum during the time the clutch elements 21 and 22 are engaged is caused by the engagement of the clutch members 16 and 17. This is accomplished by engagement of the clutch member 39 and 40.

The drum 20 is provided with removable lagging 20a, as shown in Fig. 2, this removable lagging being suitably clamped on the drum and having radial driving pins or lugs 20b which extend into openings in the drum and lagging.

The rear drum which, in the type of excavator of this invention, constitutes a holding and closing line drum for operating a clam shell bucket when the excavator is doing clam shell work, and constitutes the raising and lowering means for the dipper when the machine is being used as a shovel, is shown in detail in Fig. 4. This drum is freely rotatable on the rear drum shaft 3, the drum being designated as 41, and is provided with removable lagging 42 similar to that employed with respect to the front drum. The drum is provided with the usual braking surface 43 for engagement with the holding band 44. The shaft 3 is suitably carried by the cover 2 for the unitary gear housing 1 and carries thereon a sleeve 45 having secured thereto the pinion 46. Driving pins 47 are provided between the sleeve 45 and the pinion 46 and these parts are held together by suitable fastenings, such as the bolts 48.

Keyed to the other end of the sleeve 45 is the clutch band spider 49 which carries the clutch band 50 adapted to be moved into engagement with the clutch drum 51 forming a part of the rear drum 41. The engagement of the band 50 with the drum 51 provides a drive connection between the pinion 46 and the rear main drum 41. The pinion 46, as seen in Fig. 1, meshes with the pinion 13 carried by the idler shaft 14, and since this pinion 13 also drives the main front drum 20, it will be observed that by shifting either of the gears 7 or 8 into mesh with the gears 9 or 10, the rear main drum may be driven at different speeds, as well as the front main drum.

Referring again to Fig. 4, it will be observed that the cover 2 is provided with an opening 52 to receive the pinion 53 of a combined tagline and dipper trip cable reeving device. This device is carried by a cover plate 54 suitably secured to the cover 2. The cover plate 54 has suitably journaled therein the shaft 55 on which is keyed the pinion 53, while one end of this shaft projects beyond the side of the cover 54 and carries freely rotatable thereon the combined clam shell tag-line and shovel trip cable drum 56 around which is wound the tag-line and dipper trip cable 57. Keyed adjacent to the end of the shaft 55 is a friction clutch supporting spider 58, while slidably splined to the end of the shaft is the friction clutch operating collar 59 which is normally positioned so that the friction clutch will be partially engaged with the cable drum 56.

When it is desired to increase the friction between the friction clutch 58 and the drum 56 for tag-line purposes, it is only necessary to increase the inward pressure on the collar 59.

If it is desired to trip the door of the dipper when a shovel attachment is used with the machine, additional inward pressure on the collar will cause the friction clutch 58 to accomplish the desired pull on the cable 57 which would, under these conditions, be attached to the latch on the door of the dipper.

From the above it will be observed that the front and rear drums are driven by the same train of gearing and, furthermore, that the operation of the front drum is entirely independent of the operation of the rear drum. It is also notable that the casing 1 and cover 2 provide a complete closure for all the drum driving gears, permitting the use of ball and roller bearings throughout, together with provision for operating the gears in a bath of oil contained within the casing 1. The arrangement of the gears within the unitary casing to provide the drive for the front drum as well as the swing and traction mechanisms and to provide a cover for the top of the casing which carries the rear drum and its operating pinion, provides a very unique and substantial gear mounting which greatly facilitates the manufacture and assembling of the machine since the machine can be assembled under these conditions in units. Also, this construction permits ready removal or replacement of parts. The enclosing of the gears within the casing greatly reduces the noise of operation, as well as liability of injury to workmen or danger of objects being caught within the gears and causing breakage of parts.

While the specific details of construction have been herein shown and described, the invention is not confined thereto as changes and alterations may be made without departing from the spirit thereof as defined by the appended claims.

Having thus described my invention, what I claim as new and desire to secure by Letters Patent is:

1. In an excavating machine operating mechanism, a plurality of rotatable cable drums, supports therefor, including an inclosing gear casing, a drive shaft extending into said casing, a reduction gear train within the casing for driving the cable drums from the drive shaft including a common idler gear arranged between the reduction gear train and both of the cable drums to simultaneously drive certain of the cable drums in the same direction, change speed gears within the gear train for establishing a variable gear ratio between the idler gear and the drive shaft, supplemental gearing within the casing arranged between the idler gear and one of the cable drums to drive said drum in a reverse direction, and means for establishing and interrupting the driving relation between the idler gear and the said drum.

2. In an excavating machine operating mechanism, a pair of cable drums arranged in parallel relation, supports for said drums including a hollow gear casing arranged at one side of the cable drums, a drive shaft extending into said casing, a drive pinion operated by said drive shaft, a second shaft within the casing, gear thereon adapted to be driven by the adjacent drive pinion, a pair of change speed gears splined for longitudinal movement on said second shaft and movable to engage one or the other of a pair of the change speed gears secured to a third parallel shaft, a driving gear carried by said shaft and meshing with an idler gear on a fourth shaft, and a driving pinion adapted to be operatively connected to each of said cable drums and arranged within the casing in meshing relation with the idler pinion on the said fourth shaft.

3. In an excavating machine operating mechanism, a pair of cable drums arranged in paralleled relation, supports for said drums including a hollow gear casing arranged at one side of the cable drums, a drive shaft extending into said casing, a drive pinion operated by said drive shaft, a second shaft within the casing, gear thereon adapted to be driven by the adjacent drive pinion, a pair of change speed gears splined for longitudinal movement on said second shaft and movable to engage one or the other of a pair of the change speed gears secured to a third parallel shaft, a driving gear carried by said shaft and meshing with an idler gear on a fourth shaft, a driving pinion adapted to be operatively connected to each of said cable drums and arranged in meshing relation with the idler gear 13, and a fifth shaft carrying a reverse pinion thereon arranged within the casing in meshing relation with the idler pinion and a second pinion gear arranged for driving one of said cable drums in a reverse direction.

4. In operating gearing for cranes of the shovel, clam-shell and drag-line types, in combination, a main drum, a driving shaft operable from an engine, a driven gear operatively connected with the driving shaft, gearing and clutch means for transmitting reverse motion to the main drum and common to the driven gear for causing crowding-out and pulling-in action of a shovel, a second drum for shovel hoist or clam-shell or other type of crane work, with means to carry off motion from the said driven gear to the second drum, and mechanism to change the speed of the driven gear so that the speeds of the two drums may be varied to render the same high or low dependent on the kind of crane work the machine is to perform.

5. In operating gearing for cranes of the shovel, clam-shell and drag-line types, in combination, a main drum, a driving shaft operable from an engine, a driving gear on said shaft, a driven gear, change speed gears intermediate the driving gear and the driven gear, a main cable drum, reverse motion transmitting means between the main drum and the said driven gear, a second cable drum geared to the driven gear, means to independently control the transmission of motion from the driven gear to the two drums, and a boom hoist drum having its axis common to that of the main drum and drivable at plural speeds by said change-gears through said driven gear.

6. In an excavator of the class described, a front drum shaft, a rear drum shaft, drums on said shafts, clutch means to establish a driving relation between the drums and their respective shaft, a driving gear on each shaft for driving the same, an idler gear meshing with the aforementioned gears, a driving gear meshing with the aforementioned idler gear to drive the same, a second gear on one of the aforementioned shafts, clutch means to establish driving relation between said gear and the drum on said shaft and a second idler gear meshing with the aforementioned idler gear and the second gear to establish a reverse driving action to said drum.

LESLIE A. RUSSELL.